(12) United States Patent
Refsum

(10) Patent No.: US 7,703,778 B2
(45) Date of Patent: Apr. 27, 2010

(54) DEVICE FOR HEIGHT ADJUSTMENT OF A CHILD SEAT AND TELESCOPICALLY ADJUSTABLE FOOT SUPPORT

(75) Inventor: Bjørn Refsum, Ålesund (NO)

(73) Assignee: Stokke A/S, Skodje (NO)

( * ) Notice: Subject to any disclaimer, the term of this patent is extended or adjusted under 35 U.S.C. 154(b) by 0 days.

(21) Appl. No.: 10/563,143

(22) PCT Filed: Jun. 25, 2004

(86) PCT No.: PCT/NO2004/000188

§ 371 (c)(1),
(2), (4) Date: Dec. 30, 2005

(87) PCT Pub. No.: WO2005/002946

PCT Pub. Date: Jan. 13, 2005

(65) Prior Publication Data

US 2006/0152059 A1     Jul. 13, 2006

(30) Foreign Application Priority Data

Jul. 3, 2003    (NO)   ................................. 20033053

(51) Int. Cl.
    *B62B 7/00*        (2006.01)
    *A47C 1/00*        (2006.01)
    *A47C 20/00*      (2006.01)
(52) U.S. Cl. ............. 280/47.4; 297/344.18; 297/423.19
(58) Field of Classification Search ............ 297/423.38, 297/423.25, 423.34, 423.2, 423.23, 344.18, 297/344.12, 338, 423.19, 250.1, 411.36, 297/375; 248/423, 409, 408, 407, 161, 414, 248/157, 125.8, 411, 412; 403/109.3, 330, 403/327, 377, 374.1, 374.5, 110, 374.2, 379.4, 403/109.4; 280/47.4, 47.38
See application file for complete search history.

(56) References Cited

U.S. PATENT DOCUMENTS

| 872,739 | A | * | 12/1907 | McDaniel | ....................... 297/4 |
|---|---|---|---|---|---|
| 1,334,771 | A | * | 3/1920 | McClary et al. | .......... 297/423.3 |
| 1,726,372 | A | * | 8/1929 | Stoll | .......................... 248/601 |
| 1,964,216 | A | | 6/1934 | Sargent | |
| 2,659,413 | A | * | 11/1953 | Cramer | .................. 297/423.38 |

(Continued)

FOREIGN PATENT DOCUMENTS

DE               19733785        2/1999

(Continued)

OTHER PUBLICATIONS

English translation of Taiwanese Publication No. 459721 dated Oct. 11, 2001.
Norwegian Search Report for Norwegian Patent Application No. 20033053 dated Mar. 1, 2004.
International Search Report for International Application No. PCT/NO2004/000188 dated Oct. 18, 2005.

*Primary Examiner*—Milton Nelson, Jr.
(74) *Attorney, Agent, or Firm*—Kolisch Hartwell, P.C.

(57) ABSTRACT

Device (1) for height adjustment of a module, such as a children's seat (3) on a stem (2) in a trolley or a chair, characterized in that the locking device (1) comprises a movable casing (4) which partly or completely surrounds the stem (2), a friction element (5) and a handle (6) which rotates eccentrically in order to tighten the friction element (5) against the stem (2) and providing friction between the locking device (1) and the stem (2). The children's seat (3) may comprise a footrest (20) characterized in that two rails (21) are received in guides (22) integrated in the seat, such that the footrest (20) may be displaced telescopically in relation to the seat (3).

8 Claims, 6 Drawing Sheets

U.S. PATENT DOCUMENTS

Figure 1:
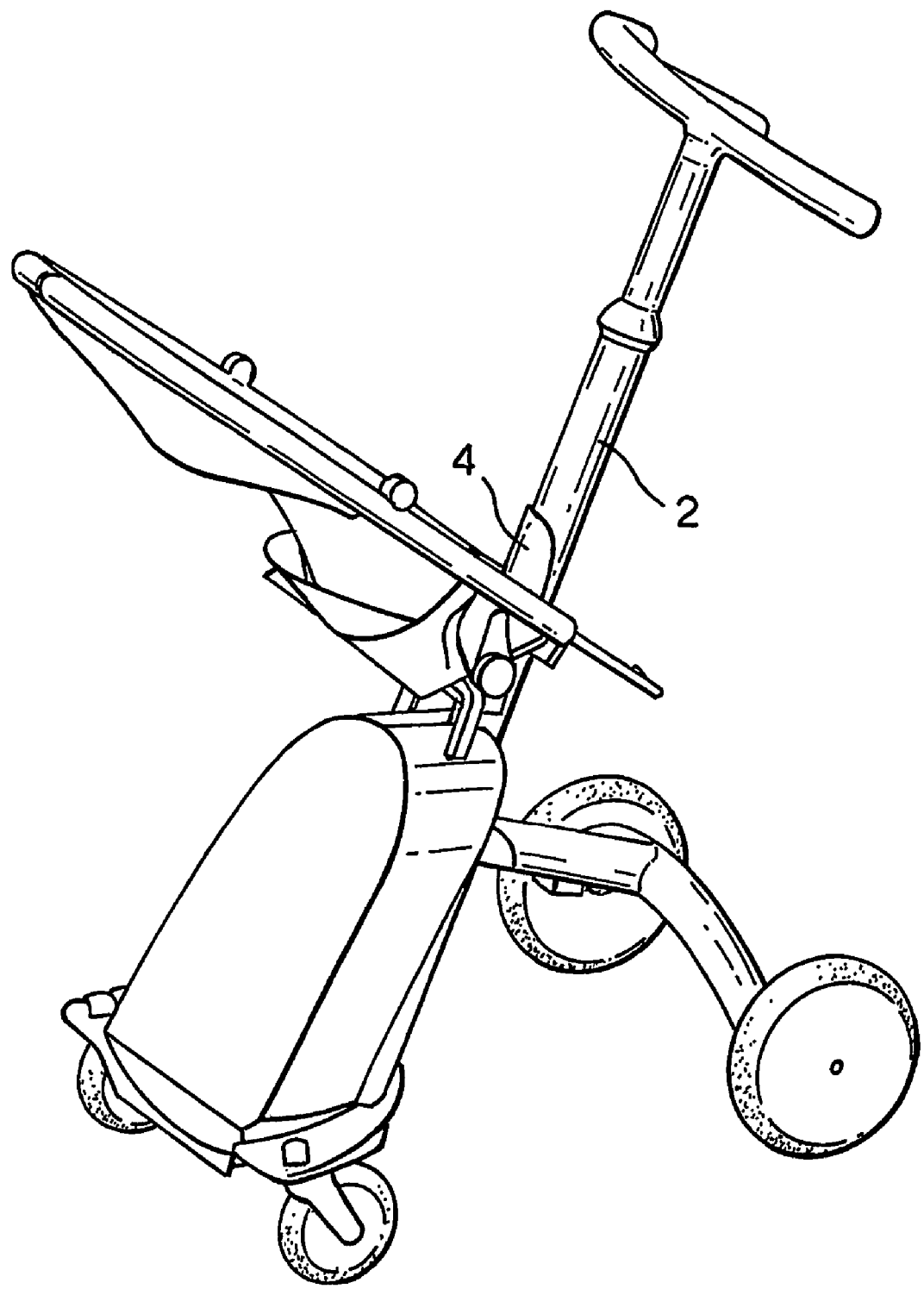
Figure 2:
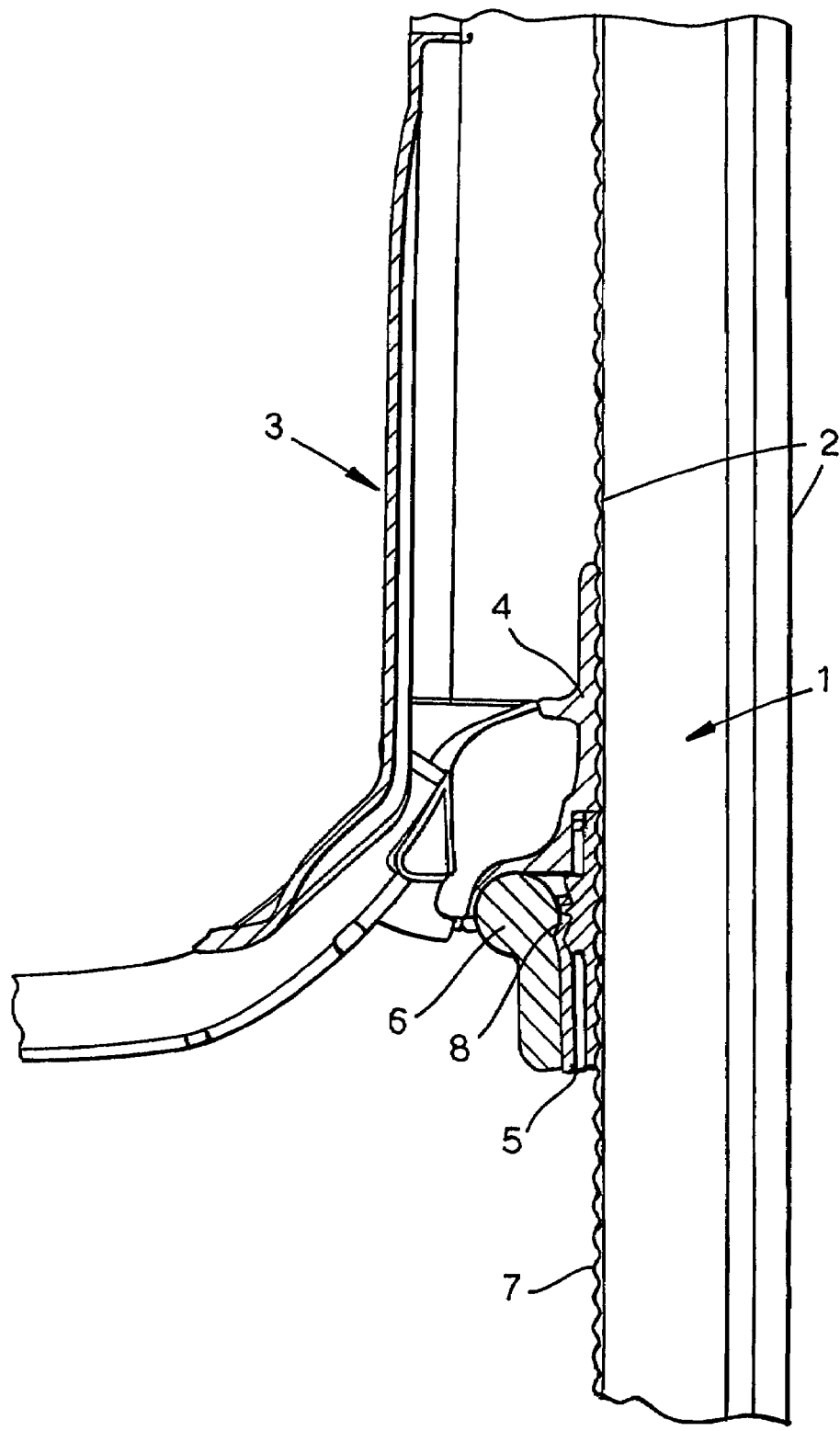

| | | | | |
|---|---|---|---|---|
| 2,904,102 | A * | 9/1959 | Komori | 297/250.1 |
| 3,625,563 | A | 12/1971 | Aberdeen et al. | |
| 4,714,292 | A | 12/1987 | Kassai | |
| 5,451,072 | A | 9/1995 | Weng | |
| 5,618,083 | A | 4/1997 | Martone et al. | |
| 6,032,975 | A | 3/2000 | Hanson et al. | |
| 2006/0001226 | A1 | 1/2006 | Refsum | |

FOREIGN PATENT DOCUMENTS

| | | |
|---|---|---|
| DE | 20307043 | 10/2003 |
| EP | 0347005 | 4/1991 |
| EP | 1332956 | 8/2003 |
| NO | 20015159 | 4/2003 |
| WO | WO85/01874 | 5/1985 |
| WO | WO/0132493 | 5/2001 |
| WO | WO03/035448 | 5/2003 |

* cited by examiner

DEVICE FOR HEIGHT ADJUSTMENT OF A CHILD SEAT AND TELESCOPICALLY ADJUSTABLE FOOT SUPPORT

The present invention relates to a seat, especially a children's seat, which may be height adjusted in relation to a stem which the seat is fastened to, said stem being equipped with a telescopic length-adjustable footrest.

BACKGROUND OF THE INVENTION

A children's trolley with height-adjustable seat is known from prior art, and is described in Norwegian patent application 2001 5159, wherein the seat may be fastened onto the central stem at different levels. Height regulation of this manner may be achieved by known methods such as through clamping means or snap-on locks, which clamp around the main stem, or a hole/pin system. The disadvantage with these systems is that they are cumbersome and time consuming to use.

From regular children's trolleys, footrests are known which may be adjusted at an angle according to whether the child is sitting upright or sleeping, or is lying in a position somewhere between. Such footrests may be rotated around an axis at the extreme of the seating area of the seat. The disadvantage with these solutions is that the length of the footrest is suited to the largest children for which the trolley is designed. Therefore, the footrest is in the way, when a small child or baby uses the trolley, as only a small part of the footrest is used.

Furthermore, adjustable foot blocks are known from children's bicycle seats, which may be secured at different heights in the extension of the seat, which project downward on either side of the bicycle, often in order to protect the child from the spokes of the wheel. The seat is of a size which should fit a child up to a certain age. When the foot blocks or footrests are used in the upper position for a small child, large parts of the lower part of the seat are not used, thus occupying space when, for example, the seat is dismantled and stored. The foot blocks are equipped with coupling devices which fit into receiving coupling devices at different heights on the seat itself. Generally, one foot block must be adjusted at a time, and the user of the bicycle must park the bicycle and use both hands to do so.

There therefore exists a need for a footrest which may be adjusted in length in a simple manner, without occupying unnecessary space and which may possibly be removed and attached as required, preferably single handedly.

Furthermore, there is a need for the possibility to adjust the height of the trolley seat in a quick and simple manner during use, and not only as the child grows.

OBJECT OF THE INVENTION

The object of the present invention is to obtain a seat for children for use in, for example, a trolley which may be height adjusted in a simple manner, and which has a footrest which may be adjusted to fit the child using the seat, and which does not occupy unnecessary space.

DETAILED DESCRIPTION OF THE INVENTION

The above objects are attained by a locking device and a seat as described below.

The present invention therefore concerns a locking device and a seat with a telescopic footrest for use in a trolley as shown in FIG. 1.

The locking device shown in FIG. 1 is adapted to the stem 2 to which the seat 3 will be attached. The locking device may be an integrated part of the seat 3, or a separate part onto which a separate part such as the seat 3 or other modules may be attached.

Figure 3:
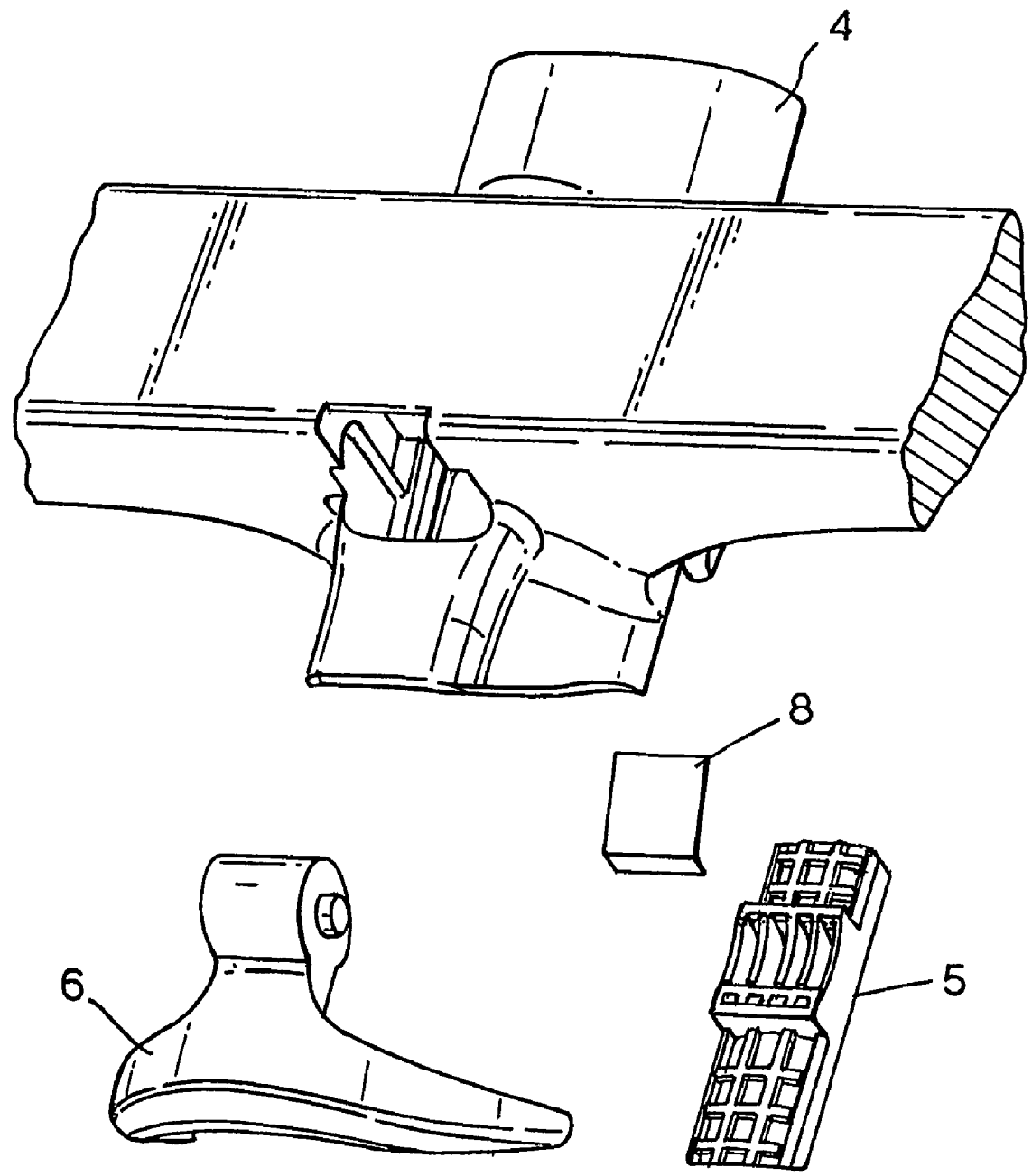

In the present embodiment, the locking device 1 is formed as a casing 4 around the figure of the stem as shown in FIG. 3, and may glide up and down along the stem 2. The casing 4 may surround the stem 2 completely, or have an open side and possibly rails gripping into corresponding tracks in the longitudinal direction of the stem 2.

The sectional profile of the locking device 1, may advantageously be essentially the same shape as the stem 2, in order to avoid dirt and particles jamming between the two elements.

The locking device 1 is further equipped with a friction element 5 and a handle 6, rotating eccentrically and used to tighten the friction element 5 against the stem 2, creating sufficient friction between the locking means 1 and the stem 2. In this manner a seat 3 fastened to the locking device 1 may, for example, retain its position on the stem even with the load of a child. In order to lock the handle 6 and provide resistance against unintended release, the locking device 1 is equipped with a spring 8, in this embodiment, located between the handle 6 and the friction element 5.

It is also advantageous for increased security if the stem 2 is equipped with a friction pattern 7, such as grooves or indents, increasing the friction against the friction element 5 which may be made of an elastic material which adapts to the friction pattern. The friction element 5 may possibly be a hard material such as plastic and may have the counterpart pattern of the friction pattern 7 on the stem 2, such that the locking device 1 tolerates heavy loads when it is tightened firmly with the handle 6.

The locking device 1 may be an integrated part of the seat 1, or another module which may be fastened onto the stem 2 of, for example, a trolley or a stem of a chair. The locking device may possibly contain fastening or coupling means, making it possible to fasten modules to it, such as a baby seat, a luggage holder, or a bracket for such modules.

Figure 4:
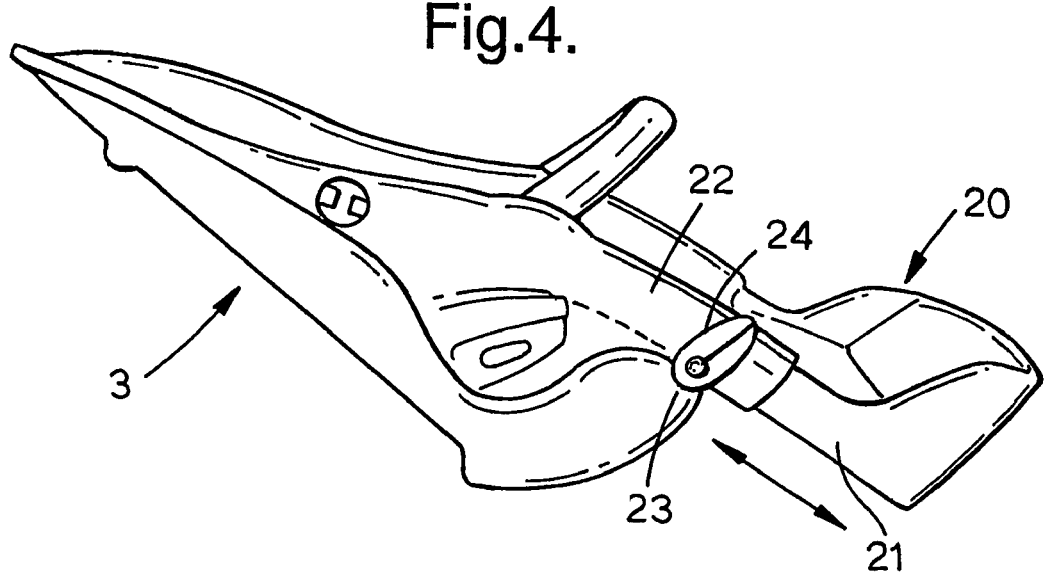
Figure 5:
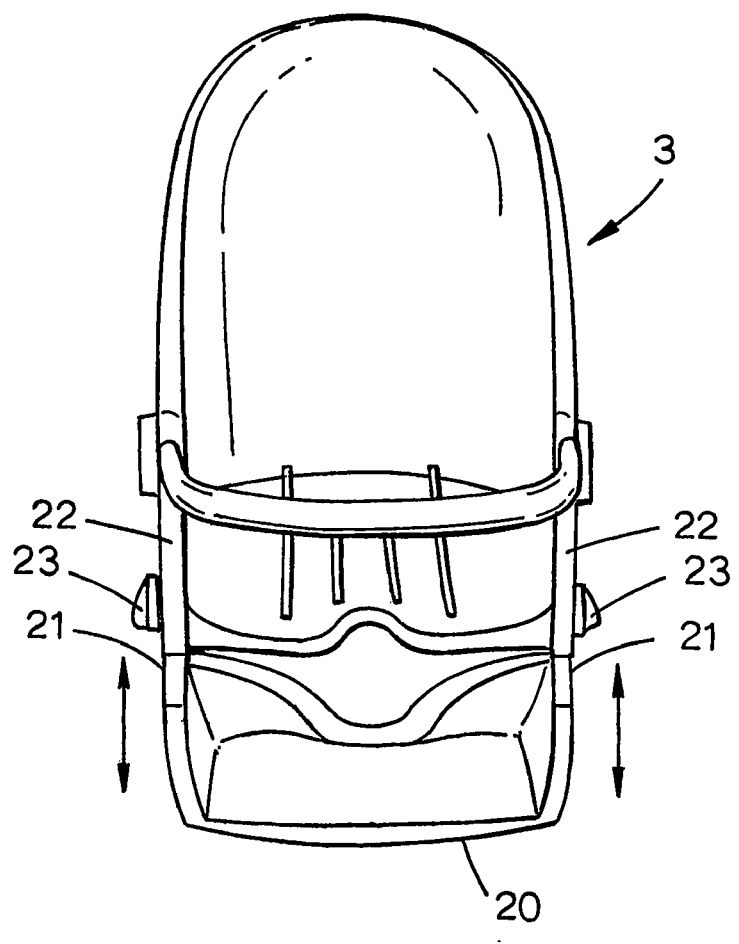
Figure 6:
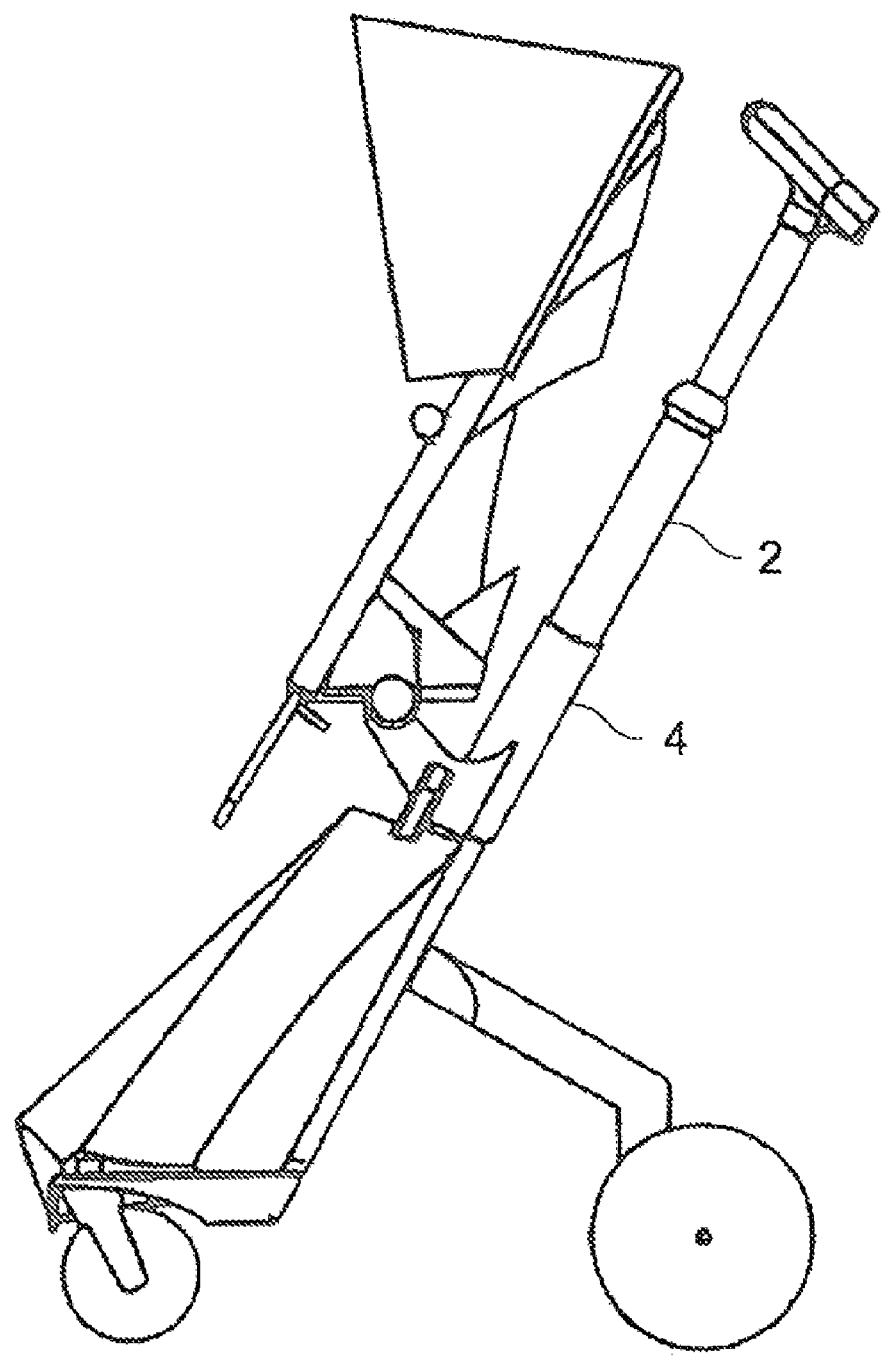
Figure 7:
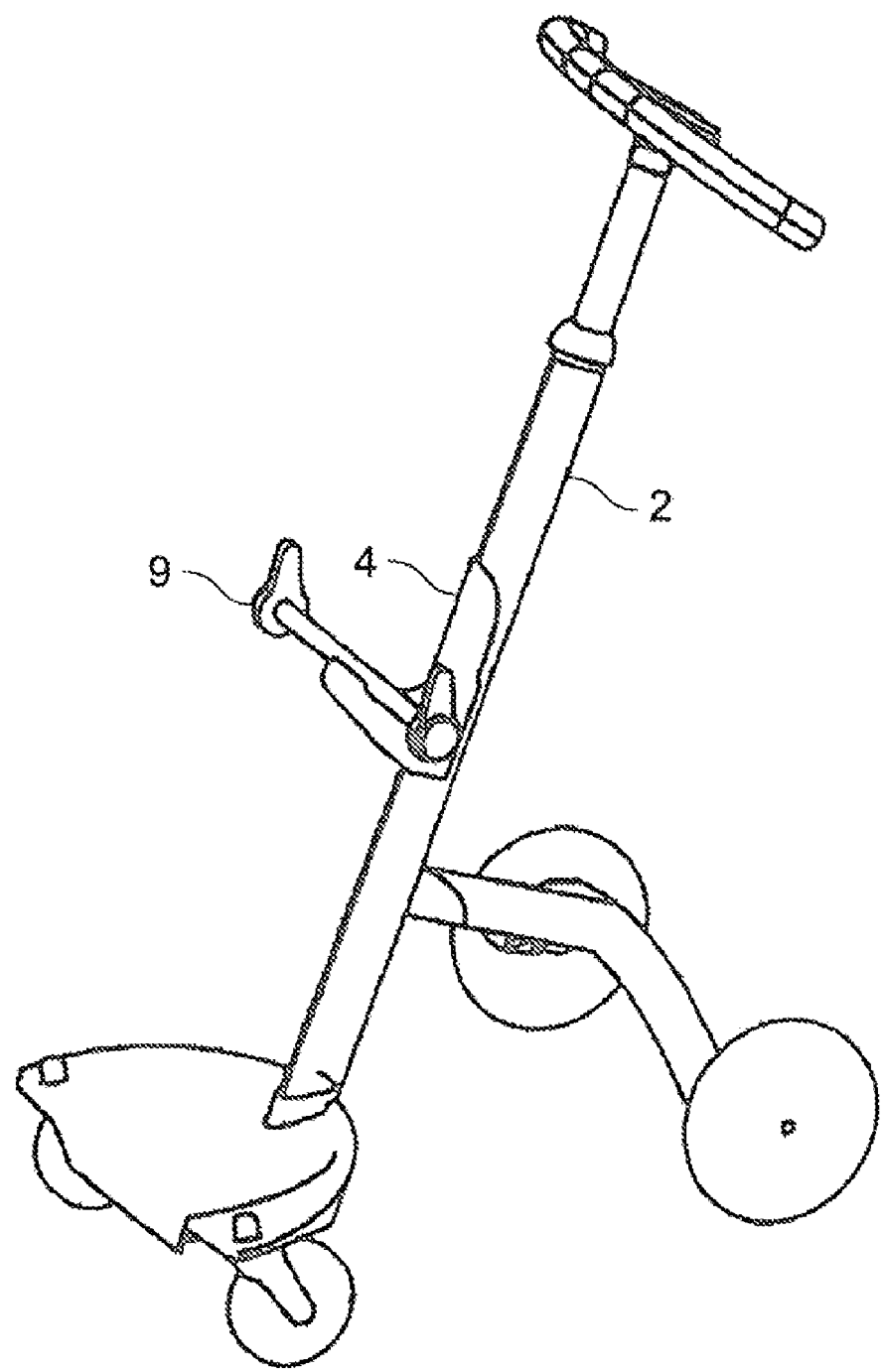

As the seat 3 may be adjusted to different height positions, it is advantageous if the seat 3 comprises a telescopic foot rest 20 as shown in FIG. 4. With the possibility to receive the length of the foot rest 20 into the seat, the seat 3 may for example be placed all the way down towards the ground for a small child, so that the child may climb alone in and out of the trolley or the chair to which the seat is fastened. Possibly, the foot rest 20 may be used as a footstep to help climb up into the seat 3. In FIGS. 4 and 5 the seat 3 is shown with a footrest 20 which comprises two rails 21 connected to a common foot plate received into the guides 22 which are integrated in the seat 3. The guides have locks 23 which by, for example, friction or a hole-and-pin system, lock the foot rest 20 at the correct length according to the child's height. In a preferred embodiment, the locks 23 are spring-loaded friction locks which only allow the footrest 20 to be adjusted upwards by only sliding it, but which still prevents the footrest from slipping down.

The locks 23 may be operated by the handles 24, thus releasing the footrest 20 which may be removed from the seat. This may be preferable if the seat is used for babies who do not need the footrest, thereby reducing the weight of the seat and occupying less space. By employing a seat 3 on a trolley as shown in FIG. 1 and described in Norwegian patent application 2001 5159, it will be possible to turn the seat, positioning it either in the driving direction or the opposite direction. By providing the footrest 20 with an opening between the rails 21, the footrest may be received into the seat 3 when the seat is mounted in the opposite direction of the driving direction, so that the rails 21 pass on either side of the stem 2. The footrest may be mounted by using only one hand to push the footrest 20 into place, using the above mentioned favorable embodiment of the locks 23.

The invention claimed is:

1. A height adjustment locking device of a module of a wheeled trolley for children, said trolley having a single stem, wherein the locking device is arranged between the module and the stem of the trolley, the locking device comprising:
    a movable casing which substantially surrounds the stem;
    a handle rotating eccentrically in order to provide tension and friction against the stem;
    a friction element arranged between the handle and the stem;
    a spring-arranged between the handle and the friction element;
    wherein the stem is equipped with a friction pattern; and
    the friction element has a pattern corresponding to the friction pattern on the stem.

2. The locking device according to claim 1, wherein the movable casing partly surrounds the stem.

3. The locking device according to claim 1, wherein the movable casing is open at one side of the stem.

4. The locking device according to claim 1, wherein the friction pattern includes grooves.

5. The locking device according to claim 1, wherein the friction pattern includes indents.

6. The locking device according to claim 1, wherein the locking device is an integrated part of the module.

7. The locking device according to claim 1, wherein the module is fastened to the locking device.

8. The locking device according to claim 1, wherein the module is a children's seat.

* * * * *